(12) United States Patent
Freund et al.

(10) Patent No.: US 10,083,634 B2
(45) Date of Patent: Sep. 25, 2018

(54) IN-MOLD LABELED ARTICLE AND METHOD

(75) Inventors: Robert F. Freund, Centerville, OH (US); Rajendra Mehta, Centerville, OH (US)

(73) Assignee: Taylor Communications, Inc., North Mankaio, MN (US)

( * ) Notice: Subject to any disclaimer, the term of this patent is extended or adjusted under 35 U.S.C. 154(b) by 2029 days.

(21) Appl. No.: 12/946,378

(22) Filed: Nov. 15, 2010

(65) Prior Publication Data
US 2012/0119482 A1 May 17, 2012

(51) Int. Cl.
G09F 3/02 (2006.01)
B29C 49/24 (2006.01)

(52) U.S. Cl.
CPC ............... *G09F 3/02* (2013.01); *B29C 49/24* (2013.01)

(58) Field of Classification Search
USPC ...... 283/79, 81, 107, 109, 110; 40/306, 310, 40/626, 630
See application file for complete search history.

(56) References Cited

U.S. PATENT DOCUMENTS

| | | |
|---|---|---|
| 4,321,404 A | 3/1982 | Williams et al. |
| 4,330,578 A | 5/1982 | Nishihira et al. |
| 4,369,157 A | 1/1983 | Conner |
| 4,418,033 A | 11/1983 | Hatakeyama |
| 4,427,615 A | 1/1984 | Eskesen |
| 4,544,184 A | 10/1985 | Freund et al. |
| 4,574,366 A | 3/1986 | Potember et al. |
| 4,621,837 A * | 11/1986 | Mack .............................. 283/105 |
| 4,650,533 A | 3/1987 | Parker et al. |
| 4,808,366 A | 2/1989 | Kaminski et al. |

(Continued)

FOREIGN PATENT DOCUMENTS

| | | |
|---|---|---|
| DE | 10220502 A1 | 11/2003 |
| EP | 1 824 673 | 8/2007 |

(Continued)

OTHER PUBLICATIONS

International Search Report and Written Opinion dated Jun. 30, 2006 pertaining to International application No. PCT/US05/27387.

(Continued)

*Primary Examiner* — Matthew G Katcoff
(74) *Attorney, Agent, or Firm* — Patterson Thuente Pedersen, P.A.

(57) ABSTRACT

A labeled article, a method of making the labeled article, and a label for use in such method, contemplate the manufacture of an article having an article body made of a moldable material, and a label, integral with the article body and having an outer label surface coplanar with the outer article body surface. The label is inserted into the mold and molded into place as the article body is molded. The label has an outer film ply defining the outer label surface, a printable sheet ply inward from said outer film ply, and an adhesive layer between the outer film ply and the printable sheet ply. The outer film ply has a length and a width greater than the length and width of the printable sheet ply. The outer film ply extends beyond the printable sheet ply adjacent all edges of the printable sheet ply and shields the printable sheet ply from exposure to the environment surrounding the labeled article.

18 Claims, 2 Drawing Sheets

(56) References Cited

U.S. PATENT DOCUMENTS

| | | |
|---|---|---|
| 4,861,644 A | 8/1989 | Young et al. |
| 4,892,779 A | 1/1990 | Leatherman et al. |
| 4,904,324 A | 2/1990 | Heider |
| 4,983,348 A | 1/1991 | Barresi et al. |
| 5,172,936 A | 12/1992 | Sullivan et al. |
| 5,227,222 A | 7/1993 | Ogawa et al. |
| 5,324,567 A | 6/1994 | Bratchley et al. |
| 5,338,396 A | 8/1994 | Abdala et al. |
| 5,401,457 A | 3/1995 | Valyi |
| 5,435,963 A | 7/1995 | Rackovan et al. |
| 5,492,370 A | 2/1996 | Chatwin et al. |
| 5,512,227 A | 4/1996 | Grazioli |
| 5,514,427 A | 5/1996 | Ellison et al. |
| 5,522,623 A | 6/1996 | Soules et al. |
| 5,536,539 A | 7/1996 | Ellison et al. |
| 5,591,384 A | 1/1997 | Abrams et al. |
| 5,626,339 A | 5/1997 | Schickert et al. |
| 5,629,029 A | 5/1997 | Souder et al. |
| 5,637,329 A | 6/1997 | Abrams et al. |
| 5,658,672 A | 8/1997 | Lenke et al. |
| 5,676,981 A | 10/1997 | Miyazawa et al. |
| 5,686,504 A | 11/1997 | Ang |
| 5,698,283 A | 12/1997 | Yamasaki et al. |
| 5,705,255 A | 1/1998 | Grazioli |
| 5,707,472 A | 1/1998 | Smith |
| 5,711,839 A | 1/1998 | Dronzek, Jr. |
| 5,795,527 A | 8/1998 | Nakamura et al. |
| 5,800,757 A | 9/1998 | Abrams et al. |
| 5,897,741 A | 4/1999 | Mills et al. |
| 5,914,170 A | 6/1999 | Rabe et al. |
| 5,935,692 A | 8/1999 | Smith |
| 5,937,554 A | 8/1999 | Haugk et al. |
| 5,951,055 A | 9/1999 | Mowry, Jr. |
| 6,001,292 A | 12/1999 | Atake |
| 6,004,682 A | 12/1999 | Rackovan et al. |
| 6,007,759 A | 12/1999 | Ten Tije et al. |
| 6,025,068 A | 2/2000 | Pekala |
| 6,028,518 A | 2/2000 | Rankin et al. |
| 6,089,611 A | 7/2000 | Blank |
| 6,106,110 A | 8/2000 | Gundjian et al. |
| 6,107,920 A | 8/2000 | Eberhardt et al. |
| 6,114,023 A | 9/2000 | Schwarz et al. |
| 6,117,264 A * | 9/2000 | Brewster ................ 156/249 |
| 6,165,576 A | 12/2000 | Freedman et al. |
| 6,234,536 B1 * | 5/2001 | Pittman et al. ............. 283/81 |
| 6,236,753 B1 | 5/2001 | Inamoto |
| 6,280,544 B1 | 8/2001 | Fox et al. |
| 6,319,682 B1 | 11/2001 | Hochman |
| 6,357,799 B1 | 3/2002 | Shibata et al. |
| 6,417,904 B1 | 7/2002 | Yamaoka et al. |
| 6,494,943 B1 | 12/2002 | Yu et al. |
| 6,544,634 B1 | 4/2003 | Abrams et al. |
| 6,569,280 B1 | 5/2003 | Mehta et al. |
| 6,661,339 B2 | 12/2003 | Muirhead |
| 6,692,799 B2 | 2/2004 | Waller, Jr. |
| 6,837,959 B2 | 1/2005 | Daems et al. |
| 6,898,458 B2 | 5/2005 | Zeng et al. |
| 6,943,678 B2 | 9/2005 | Muirhead |
| 6,990,723 B1 | 1/2006 | Hoogland |
| 7,119,129 B2 | 10/2006 | Krohn |
| 7,166,249 B2 | 1/2007 | Abrams et al. |
| 7,259,856 B2 | 8/2007 | Kachanov et al. |
| 7,369,048 B2 | 5/2008 | Freund |
| 7,377,859 B2 * | 5/2008 | Reardon ................ 473/300 |
| 7,806,158 B2 | 10/2010 | Freund |
| 7,927,688 B2 | 4/2011 | Abrams et al. |
| 2002/0103439 A1 | 8/2002 | Zeng et al. |
| 2002/0195195 A1 | 12/2002 | Grabau et al. |
| 2003/0136503 A1 | 7/2003 | Green et al. |
| 2003/0173717 A1 | 9/2003 | Abrams et al. |
| 2003/0222100 A1 * | 12/2003 | Husband et al. ............. 222/105 |
| 2004/0074973 A1 | 4/2004 | Schneck et al. |
| 2004/0083918 A1 | 5/2004 | Jack |
| 2004/0094949 A1 | 5/2004 | Savagian et al. |
| 2004/0168618 A1 | 9/2004 | Muirhead |
| 2004/0209063 A1 | 10/2004 | Gallagher et al. |
| 2004/0224786 A1 | 11/2004 | Reardon |
| 2004/0238098 A1 | 12/2004 | Bleckmann et al. |
| 2004/0238623 A1 | 12/2004 | Asp |
| 2005/0100751 A1 * | 5/2005 | Nishizawa et al. ........... 428/515 |
| 2005/0184505 A1 * | 8/2005 | Barlow ................... 283/81 |
| 2005/0237184 A1 | 10/2005 | Muirhead |
| 2005/0241548 A1 | 11/2005 | Muirhead |
| 2006/0086013 A1 | 4/2006 | Stegman et al. |
| 2006/0176180 A1 | 8/2006 | Freund |
| 2007/0079928 A1 | 4/2007 | Abrams et al. |
| 2007/0154677 A1 | 7/2007 | Abrams et al. |
| 2007/0243367 A1 | 10/2007 | Nagatake et al. |
| 2007/0254126 A1 * | 11/2007 | Lilienthal ................ 428/40.1 |
| 2008/0145611 A1 * | 6/2008 | Mess et al. ............... 428/143 |
| 2008/0173405 A1 | 7/2008 | Freund |
| 2008/0176011 A1 | 7/2008 | Abrams et al. |

FOREIGN PATENT DOCUMENTS

| | | |
|---|---|---|
| EP | 1 910 981 | 4/2008 |
| GB | 2 327 906 A | 2/1999 |
| JP | 10128789 A | 5/1998 |
| MX | 2007006502 A | 9/2007 |
| WO | 95/32088 A1 | 11/1995 |
| WO | 98/15414 A1 | 4/1998 |
| WO | 03/069552 A1 | 8/2003 |
| WO | 2006/060043 A2 | 6/2006 |
| WO | 2007/064361 A2 | 6/2007 |

OTHER PUBLICATIONS

International Search Report and Written Opinion dated Oct. 9, 2007 pertaining to International application No. PCT/US06/24709.

Supplementary European Search Report dated Jul. 15, 2009 pertaining to EP application No. 05778217.9.

IBM Technical Disclosure Bulletin; Mar. 1, 1996; pp. 129-130; vol. 39, Issue #3; 0018-8689-39-3-129.

Office Action pertaining to U.S. Appl. No. 12/056,682 dated Jun. 10, 2009.

Office Action pertaining to U.S. Appl. No. 12/056,682 dated Dec. 29, 2009.

Interview Summary pertaining to U.S. Appl. No. 12/056,682 dated Jul. 29, 2010.

Supplementary European Search Report dated Oct. 18, 2010 in reference to co-pending European Patent Application No. 06847448. 5.

* cited by examiner

IN-MOLD LABELED ARTICLE AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This relates to a labeled article which has a label applied during a molding process, and to a method of making such an article. The labeled article is highly resistant to harsh environmental conditions to which it may be subjected in use. More particularly, the labeled article resists deterioration from mechanical wear, chemicals, moisture, and abrasion.

Product manufacturers place a high value on the ability to deliver molded articles with high quality graphic surfaces. This has traditionally required a trade-off between the quality of the images, the permanence of the images, and the print media utilized. High quality graphic surfaces have been achieved by lithographically printing adhesive labels, and then applying the labels to the articles. Articles made in this way have suffered from poor label adhesion and degraded label appearance. The loss of adhesion that usually results from aging is exacerbated by environmental factors, such as moisture and large changes in temperature. This loss of adhesion is particularly acute in outdoor and automotive applications. Clearly, it is desirable that labels remain on labeled products and that the graphics on the labels remain esthetically pleasing. Further, it may also be important that the labels on the products remain attached to the products and convey needed information, such as for example product warning messages.

In-mold techniques have been developed to address these problems with articles that are manufactured in a molding process. In an in-mold labeling process, graphics, including text, are typically printed on polymer films that are compatible with the polymer material that is to be used in the molding process. It has been common to use screen-printing techniques to print on clear polymer film materials that are compatible with the polymer material from which the part is molded. The clear film allows the underlying molded polymer to show through. Many in-mold techniques have also used complex, multi-layered films to achieve a satisfactory product. The printed film label is normally placed into the mold so that the molten polymer material flows over the ink, which is trapped between the film and the polymer material. Temperatures and pressures characteristic of this technique necessitate screen printing inks that can withstand this process. The graphic detail quality achievable by these techniques is limited by the environment in which said inks must remain stable and not wash out or flow with the molten polymer. Further, screen printing by separately depositing each of a series of colors increases the cost of the product.

An improved in-mold and in-line decorating method is disclosed in U.S. Pub. App. 2007/0079928, published Apr. 12, 2007. This application teaches using a single sheet layer that allows the placement of the highest possible quality graphics into the surface of products made from a variety of moldable thermoplastic, thermoset, and vulcanizable materials using a variety of molding processes. A label-sized sheet of micro-porous material is printed using a four color process, and the printed sheet is inserted into a mold. The article is then molded, producing a finished, labeled part. While this process represents an advance over the prior art, the surface of the micro-porous sheet is exposed to the environment to which the article is subjected.

It is desired that a labeled article and method of making the article be provided in which the labeled article resists deterioration from exposure to a harsh environment.

SUMMARY

This need is met by a labeled article, a method of making the labeled article, and a label for use in such method, in which a label is molded into the article at the time that the article is molded. The labeled article includes an article body made of a moldable material, having an outer article body surface, and a label, integral with the article body, having an outer label surface that is generally coplanar with the outer article body surface. The label comprises an outer film ply defining the outer label surface, a printable sheet ply inward from the outer film ply, and an adhesive layer between the outer film ply and the printable sheet ply. The outer film ply has a length and width greater than the length and width of the printable sheet ply such that the outer film ply extends beyond the printable sheet ply adjacent all edges of the printable sheet ply and shields the printable sheet ply from exposure to the environment.

The adhesive layer may be a UV curable adhesive. Alternatively, the adhesive layer may be an IR curable adhesive. The printable sheet may be made of a sheet of micro-porous material. The printable sheet may be made of a dimensionally stable, single layer, micro-porous polyethylene film. The label is permanently fused to the article body during the manufacture of the article. The printable sheet ply is printed on the surface thereof facing the outer film ply, such that the printing is visible through the adhesive and the outer film ply.

The printable sheet ply may carry ink jet printing, laser printing, flexographic printing, gravure printing, letterpress printing, intaglio printing, thermal printing, or screen printing.

The method of making the labeled article may comprise the steps of positioning a label in a mold, supplying curable material to the mold, curing the curable material, and ejecting the article from the mold to produce a labeled article. The label comprises an outer film ply defining the outer label surface, a printable sheet ply inward from the outer film ply, and an adhesive layer between the outer film ply and the printable sheet ply. The outer film ply has a length and width greater than the length and width of the printable sheet ply such that the outer film ply extends beyond the printable sheet ply adjacent all edges of the printable sheet ply. The label is positioned with the outer label surface in contact with the mold surface. The outer film ply of the label is generally coplanar with the outer surface of the article, and the outer film ply shields the printable sheet ply from exposure to the environment surrounding the labeled article.

The adhesive layer between the outer film ply and the printable sheet ply may comprise a UV curable adhesive. Alternatively, the adhesive layer between the outer film ply and the printable sheet ply may comprise an IR curable adhesive. The printable sheet may be made of a sheet of micro-porous material. The printable sheet may be made of a sheet of a dimensionally stable, single layer, micro-porous polyethylene film. The step of curing the curable material may include the step of permanently fusing the label to the article body. The printable sheet ply may be printed on the surface thereof facing the outer film ply, such that the printing is visible through the adhesive and the outer film ply. The step of supplying curable material to the mold may includes the step of supplying curable material to a blow mold. The step of supplying curable material to the mold may include the step of supplying curable material to an injection mold. The step of supplying curable material to the mold may include the step of supplying curable material to a compression mold.

A label for in-mold application to a molded article, comprises an outer film ply defining an outer label surface, a printable sheet ply inward from the outer film ply made of a sheet of micro-porous material, and an adhesive layer between the outer film ply and the printable sheet ply. The adhesive is formed of an adhesive which is not reactivated or softened from heating produced during curing of moldable material in a mold. The outer film ply has a length and width greater than the length and width of the printable sheet ply such that the outer film ply extends beyond the printable sheet ply adjacent all edges of the printable sheet ply. The outer film ply shields the printable sheet ply from exposure to the environment surrounding the labeled article. The sheet of micro-porous material may be made of a dimensionally stable, single layer, micro-porous polyethylene film. The adhesive layer may be a UV curable adhesive or an IR curable adhesive. The printable sheet ply may be printed on the surface thereof facing the outer film ply, such that the printing is visible through the adhesive and the outer film ply.

DETAILED DESCRIPTION

Figure 1:
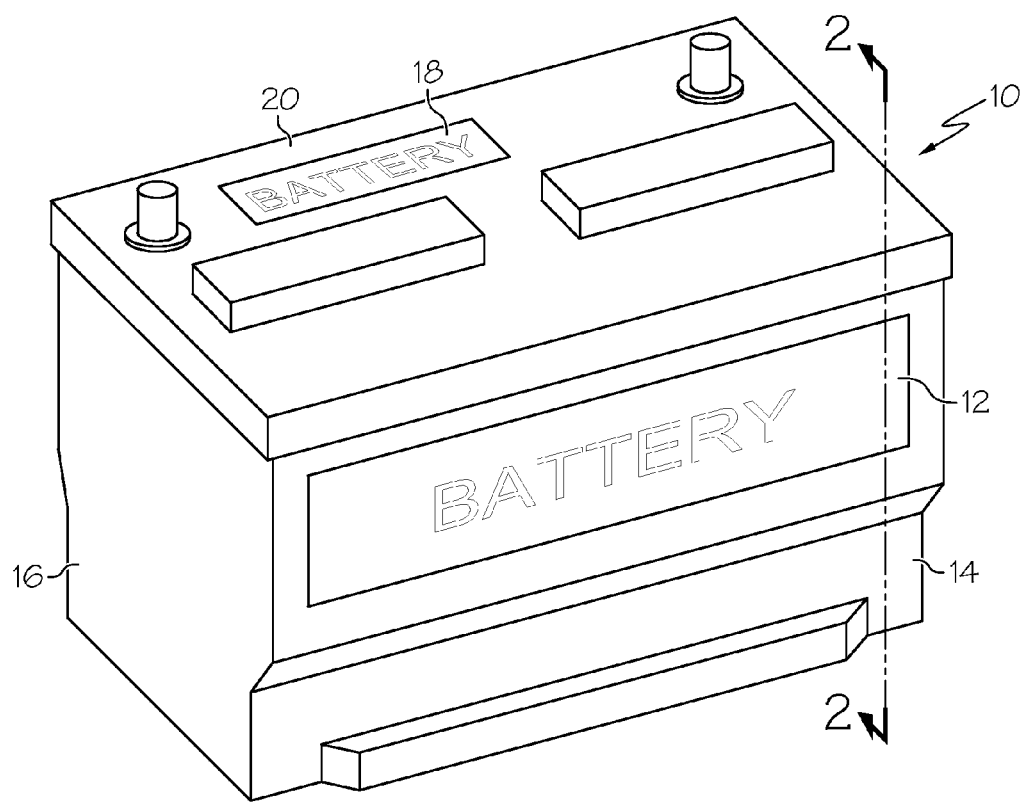
FIG. 1 is a perspective view of an exemplary labeled article, illustrated as an automobile battery.

Reference is made to FIG. 1, which shows a labeled article, namely an automobile battery having a first label 12 on a side surface 14 of the battery casing 16, and a second label 18 on the top surface 20 of the battery casing 16. The labels 12 and 18 may carry graphics, brand indicia, and information explaining use restrictions, warnings, and warranty provisions, as well as other information. In the past, it has been common to secure labels of this type to battery casings using adhesives, such as for example pressure sensitive adhesives. The environment to which automobile batteries are exposed during use is quite severe. Most printing inks and substrates are discolored or damaged by occasional and frequent exposure to the elements. It is common for printing inks and adhesive layers to deteriorate in such settings. Testing has demonstrated that chemical resistance at elevated temperatures is difficult to achieve.

Some label manufacturers have used film-rated inks and over-laminates on plastic films to make a durable top surface on batteries. However the acid, or other chemicals, and moisture can seep under the peripheral edges of these constructions, resulting in de-lamination of the label and discoloration of the ink on the label. Since these are pressure sensitive adhesive constructions, there is always an exposed edge where this can occur. The labeled article construction and method, described below, are based on in-mold label technology. By having an overlapping clear top film, as explained below, the edges of the label are sealed and the acid, chemicals, and moisture cannot penetrate the edge of the label. Because of the construction of the label, laminating adhesive and printing ink on the label are not attacked by corrosive material found in the environment of a typical automobile engine compartment.

Figure 2:
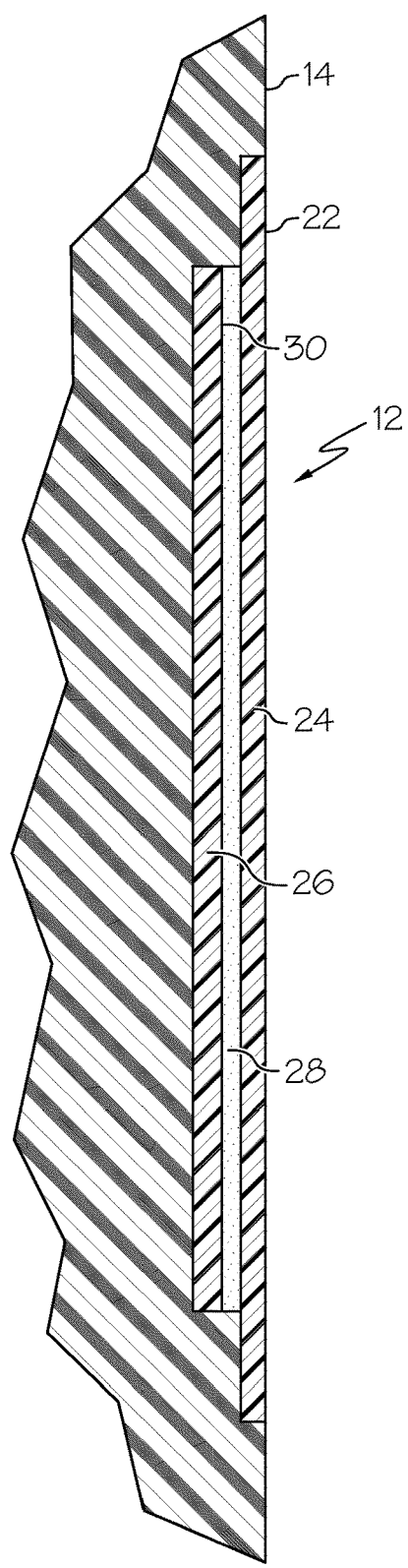
FIG. 2 is a partial, sectional view, taken generally along line 2-2 in FIG. 1, showing an in-mold label applied to the labeled article of FIG. 1.

Reference is made again to FIG. 1, as well, as FIG. 2, in which it will be seen that the article body comprises the casing 16, which is made of a moldable material, and which has an outer article body surface, such as surface 14. The label 12 is integral with the article body 16 and, as shown in FIG. 2, has an outer label surface 22 that is coplanar with the outer article body surface 14. The label 12 has an outer film ply 24 defining the outer label surface 22, a printable sheet ply 26 inward from the outer film ply 24, and an adhesive layer 28 between the outer film ply 24 and the printable sheet ply 26. The outer film ply 24 has a length and width that are greater than the length and width of the printable sheet ply 26 such that the outer film ply 24 extends beyond the printable sheet ply 26 adjacent all edges of the printable sheet ply 24 and shields the printable sheet ply 24 from exposure to the environment surrounding the labeled article 10.

The adhesive layer 28 may be a UV curable adhesive. Alternatively, the adhesive layer may be an IR curable adhesive. With either adhesive, it will be appreciated that it is important that the adhesive chosen not soften significantly when exposed to heat after it is cured, since, as explained below, the label 12 is applied to the article 10 in an in-mold process. The label 12 is permanently fused to the article body during the in-mold manufacture of the article. The printable sheet 26 may be made of a sheet of micro-porous material, such as a dimensionally stable, single layer, micro-porous polyethylene film.

The printable sheet ply 26 is printed on the surface 30 facing the outer film ply 24. Since the outer film ply 24 is transparent, the printing on the sheet ply 26 is visible through ply 24. The adhesive 28 is also transparent, at least with the thickness of the adhesive layer 28, such that the printed information on the labeled article labels can be readily seen by an observer. The ink on the surface 30 may be applied by any of a number of techniques. For example, the ink may be applied by ink jet printing, laser printing, flexographic printing, gravure printing, letterpress printing, intaglio printing, or screen printing. It is only required that the ink be stable when subjected to the temperatures found in the molding process.

The labeled article, such as the battery casing 16, is made through a process including the steps of positioning a label 12 in a mold, supplying curable material to the mold, curing the curable material, and ejecting the article from the mold to produce a labeled article in which the outer film ply 24 of the label 12 is generally coplanar with the outer surface 14 of the article 10, and in which the outer film ply 24 shields the printable sheet ply 26 from exposure to the environment surrounding the labeled article 10. The label comprises an outer film ply 24 defining the outer label surface 22, a printable sheet ply 26 inward from the outer film ply 24, and an adhesive layer 28 between the outer film ply 24 and the printable sheet ply 26. The outer film ply 24 has a length and width greater than the length and width of the printable sheet ply 26 such that the outer film ply 24 extends beyond the printable sheet ply adjacent all edges of the printable sheet ply 26. It will be appreciated that the label 12 is positioned in the mold with the outer label surface 22 in contact with the inner surface of the mold. The adhesive 28 will have been cured prior to the in-mold operation so that it remains dimensionally stable during molding. This curing will have been accomplished by subjecting the adhesive to UV radiation or IR radiation, depending on the type of adhesive selected. The printable sheet 26 will have been previously printed, and is made of a sheet of micro-porous material, such as a dimensionally stable, single layer, micro-porous polyethylene film. Such film permits the curing of the material making up the article to permanently fuse the label to the article body. The printable sheet ply carries printed indicia and graphics on the surface 30 thereof facing the outer film ply 24, such that the printing is visible through the adhesive 28 and the outer film ply 24.

The specific molding operation utilized to produce the labeled article having an in-mold label may be any of a number of known molding process for forming articles from a thermoplastic moldable material. For example, the article may be made through processes that include blow molding, injection molding, or compression molding.

It will be appreciated that the use of a clear overlapping film laminated to a dimensionally smaller printable ply that is molded onto the body of the article, thereby forming sealed edges, achieves highly desirable results. The extended film keeps corrosive materials, such as acid, chemicals and moisture, away from the printed ply and the adhesive. This arrangement provides an exceptional resistance to chemical attack. It will be appreciated that this arrangement will find wide application with all types of articles that are produced through a molding process and which are subjected to challenging conditions in use.

What is claimed is:

1. A labeled article, comprising:
    an article body made of a moldable material, having an outer article body surface, and
    a label, integral with said article body, having an outer label surface coplanar with said outer article body surface, said label comprising:
        an outer, transparent, film ply defining said outer label surface,
        a printable sheet ply inward from said outer film ply, said printable sheet ply having a surface facing the outer film ply and being printed thereon, and
        a transparent adhesive layer between said outer film ply and said printable sheet ply, said outer film ply having a length and width greater than the length and width of said printable sheet ply such that said outer film ply extends beyond said printable sheet ply adjacent all edges of said printable sheet ply and shields said printable sheet ply from exposure to the environment surrounding said labeled article, the surface of said printable sheet ply opposite said surface facing the outer film ply being substantially free of adhesive and permanently fused to said article body.
2. The labeled article of claim 1, in which said adhesive layer is a UV curable adhesive.
3. The labeled article of claim 1, in which said adhesive layer is an IR curable adhesive.
4. The labeled article of claim 1, in which said printable sheet is made of a sheet of micro-porous material.
5. The labeled article of claim 1, in which said printable sheet is made of a dimensionally stable, single layer, micro-porous polyethylene film.
6. The labeled article of claim 1, in which said label is permanently fused to said article body during the manufacture of said article.
7. The labeled article of claim 1, in which said printable sheet ply carries ink jet printing.
8. The labeled article of claim 1, in which said printable sheet ply carries laser printing.
9. The labeled article of claim 1, in which said printable sheet ply carries flexographic printing.
10. The labeled article of claim 1, in which said printable sheet ply carries gravure printing.
11. The labeled article of claim 1, in which said printable sheet ply carries letterpress printing.
12. The labeled article of claim 1, in which said printable sheet ply carries intaglio printing.
13. The labeled article of claim 1, in which said printable sheet ply carries thermal printing.
14. The labeled article of claim 1, in which said printable sheet ply carries screen printing.
15. A label for in-mold application to a molded article, comprising:
    a transparent, outer film ply defining an outer label surface,
    a printable sheet ply inward from said outer film ply made of a sheet of micro-porous material, said printable sheet ply having a surface facing the outer film ply and being printed thereon, and
    a transparent adhesive layer between said outer film ply and said printable sheet ply formed of an adhesive which is not reactivated from heating produced during curing of moldable material in a mold,
    said outer film ply having a length and width greater than the length and width of said printable sheet ply such that said outer film ply extends beyond said printable sheet ply adjacent all edges of said printable sheet ply and shields said printable sheet ply from exposure to the environment surrounding said labeled article, the surface of said printable sheet ply opposite said surface facing the outer film ply being substantially free of adhesive.
16. The label for in-mold application to a molded article according to claim 15 in which said sheet of micro-porous material comprises a sheet made of a dimensionally stable, single layer, micro-porous polyethylene film.
17. The label for in-mold application to a molded article according to claim 15 in which said adhesive layer is a UV curable adhesive.
18. The label for in-mold application to a molded article according to claim 15 in which said adhesive layer is an IR curable adhesive.

* * * * *